US008386424B2

(12) United States Patent
Sharma et al.

(10) Patent No.: US 8,386,424 B2
(45) Date of Patent: Feb. 26, 2013

(54) TRANSPARENT ACCESS MECHANISM FOR LOCAL AND REMOTE DATA

(75) Inventors: Nitin Sharma, Redmond, WA (US); Todd Manion, Seattle, WA (US); Akash Jeevan Sagar, Redmond, WA (US); Nishant Gupta, Sammamish, WA (US); Farookh Mohammed, Woodinville, WA (US); Aditya G Bhandarkar, Redmond, WA (US); Karthik Raman, Issaquah, WA (US); Ori Amiga, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 456 days.

(21) Appl. No.: 12/815,713

(22) Filed: Jun. 15, 2010

(65) Prior Publication Data

US 2011/0307442 A1    Dec. 15, 2011

(51) Int. Cl.
*G06F 17/30* (2006.01)
(52) U.S. Cl. ........ 707/610; 707/611; 707/612; 707/613; 707/614; 707/617; 707/618; 707/620; 707/624; 707/656; 707/704; 709/219; 370/254; 370/350; 718/102
(58) Field of Classification Search .......... 707/610–614, 707/617–618, 620–624, 704; 709/217, 219; 370/254, 350; 718/102
See application file for complete search history.

(56) References Cited

U.S. PATENT DOCUMENTS

| 7,634,632 | B2  |   | 12/2009 | Suponau et al. |         |
|-----------|-----|---|---------|----------------|---------|
| 7,680,067 | B2  | * | 3/2010  | Prasad et al.  | 370/254 |
| 2005/0102370 | A1 |   | 5/2005 | Lin et al. | |
| 2006/0117018 | A1 |   | 6/2006 | Christiansen et al. | |
| 2007/0016575 | A1 |   | 1/2007 | Hurst-Hiller et al. | |
| 2008/0028416 | A1 |   | 1/2008 | Gill et al. | |
| 2008/0082601 | A1 |   | 4/2008 | Meijer et al. | |
| 2008/0282247 | A1 | * | 11/2008 | Kreuder | 718/102 |
| 2009/0106456 | A1 |   | 4/2009 | Muller et al. | |
| 2009/0327447 | A1 |   | 12/2009 | Noll et al. | |
| 2010/0165975 | A1 | * | 7/2010 | Lerzer et al. | 370/350 |
| 2010/0191711 | A1 | * | 7/2010 | Carey et al. | 707/704 |
| 2010/0211654 | A1 | * | 8/2010 | Lagrange et al. | 709/219 |
| 2011/0135070 | A1 | * | 6/2011 | Cerf et al. | 379/88.12 |

OTHER PUBLICATIONS

"International Search Report", Mailed Date: Feb. 9, 2012, Application No. PCT/US2011/039303, Filed Date: Jun. 6, 2011, pp. 9.
"GridGrain Cloud Computing", Retrieved at << http://www.gridgain.com/product_features.html#key >>, Retrieved Date: Mar. 25, 2010, pp. 4.
Irimie, Alin., "Cloud Data Hub. Synchronize Your Data in the Cloud", Retrieved at << http://www.azurejournal.com/2009/06/cloud-data-hub-synchronize-your-data-in-the-clou/ >>, Jun. 3, 2009, pp. 2.

(Continued)

*Primary Examiner* — Frantz Coby

(57) ABSTRACT

A unified data access mechanism can provide transparent access to data that is either stored locally or remotely. Application programs can direct data requests and data modifications to this singular component without foreknowledge of where the data is stored. The unified data access mechanism can work in concert with a synchronization mechanism that can maintain data synchronization between local data and remote data. Requested or modified data can be identified as stored locally or remotely based on the namespace of the data. If the data is stored remotely, the user credentials associated with the user's process space within which the application program is executing can be utilized to identify, and then provide, relevant authentication information to the remote data store, should it be required.

20 Claims, 7 Drawing Sheets

OTHER PUBLICATIONS

Fontana, John., "Microsoft Melding View of Local, Cloud-Based Virtual Machines", Retrieved at << http://www.networkworld.com/news/2009/042909-microsoft-virtual-machines.html >>, Apr. 29, 2009, pp. 2.

"Medicity's Solutions Leverage an Innovative Client-Cloud Computing Approach.", Retrieved at << http://infosite.medicity.com/Technology/Client-Cloud_Computing.aspx >>, Retrieved Date: Mar. 25, 2010, pp. 2.

* cited by examiner

TRANSPARENT ACCESS MECHANISM FOR LOCAL AND REMOTE DATA

BACKGROUND

For modern computing devices, including traditional personal computers, as well as personal digital assistants, cellular telephones, and the like, network communicational abilities have become ubiquitous. As a result, an increasing amount of information utilized by such computing devices is obtained from storage devices that are physically separate from such computing devices, and with which communication is established through one or more networks. Similarly, an increasing amount of information created by such computing devices is often stored, not on a storage medium co-located with the computing device itself, but rather on storage media that are physically separate from such computing devices and communicationally connected with such computing devices through network communications.

Information stored on, and utilized from, networked storage media, such as the storage media of one or more server computing devices, can provide benefits over locally stored information. For example, information available from networked storage media can be accessed by multiple different computing devices, often simultaneously, thereby enabling greater sharing and collaboration efforts. Similarly, information stored on the storage media over one or more server computing devices can receive the practical benefits of the support provided to those server computing devices including, for example, data redundancy, data backup, uninterruptible power supply, and other like benefits. Unfortunately, however, information stored on, and utilized from, networked storage media can likewise have drawbacks as compared with locally stored information. Most notably, access to a network through which the networked storage media can be communicated with may not always be available. Additionally, the provision of data across a network can be subject to various delays that are typically not present when the data is stored on a storage medium that is local to the computing device. Such delays can include network throughput, network latency, and the inability of the networked storage media to supply data in an efficient manner to a large number of requesting clients simultaneously.

Traditionally, the developers of software application programs must decide in advance whether the computer-executable instructions that comprise their software application programs will attempt to access data that is stored locally on the computing device on which such computer-executable instructions are executing, or whether they will attempt to access data that is stored remotely, such as on networked storage media. Different function calls and access methodologies are typically utilized by such developers depending on where the data that their application programs are attempting to access is stored.

SUMMARY

In one embodiment, a single, unified access mechanism can transparently provide access to requested data irrespective of whether that data is stored locally on, or remotely from, the computing device executing the computer-executable instructions that comprise the unified access mechanism. The unified access mechanism can utilize the namespace of the requested data to determine whether the data is available locally or whether it is to be retrieved from a remote location.

In another embodiment, the unified access mechanism can be integrated with a syncing mechanism that can maintain parity between data stored locally and data stored remotely such that changes to locally stored data can be reflected automatically in the remotely stored data.

In a further embodiment, the unified access mechanism can enable the editing of locally stored data even when the computing device executing the computer executable instructions that comprise the unified access mechanism is communicationally disconnected from a network that comprises the remotely stored data. Subsequent reconnection to the network can enable the syncing mechanism to update the remotely stored data in accordance with the editing that was performed on the locally stored data.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Additional features and advantages will be made apparent from the following detailed description that proceeds with reference to the accompanying drawings.

DESCRIPTION OF THE DRAWINGS

The following detailed description may be best understood when taken in conjunction with the accompanying drawings, of which

DETAILED DESCRIPTION

Figure 1:
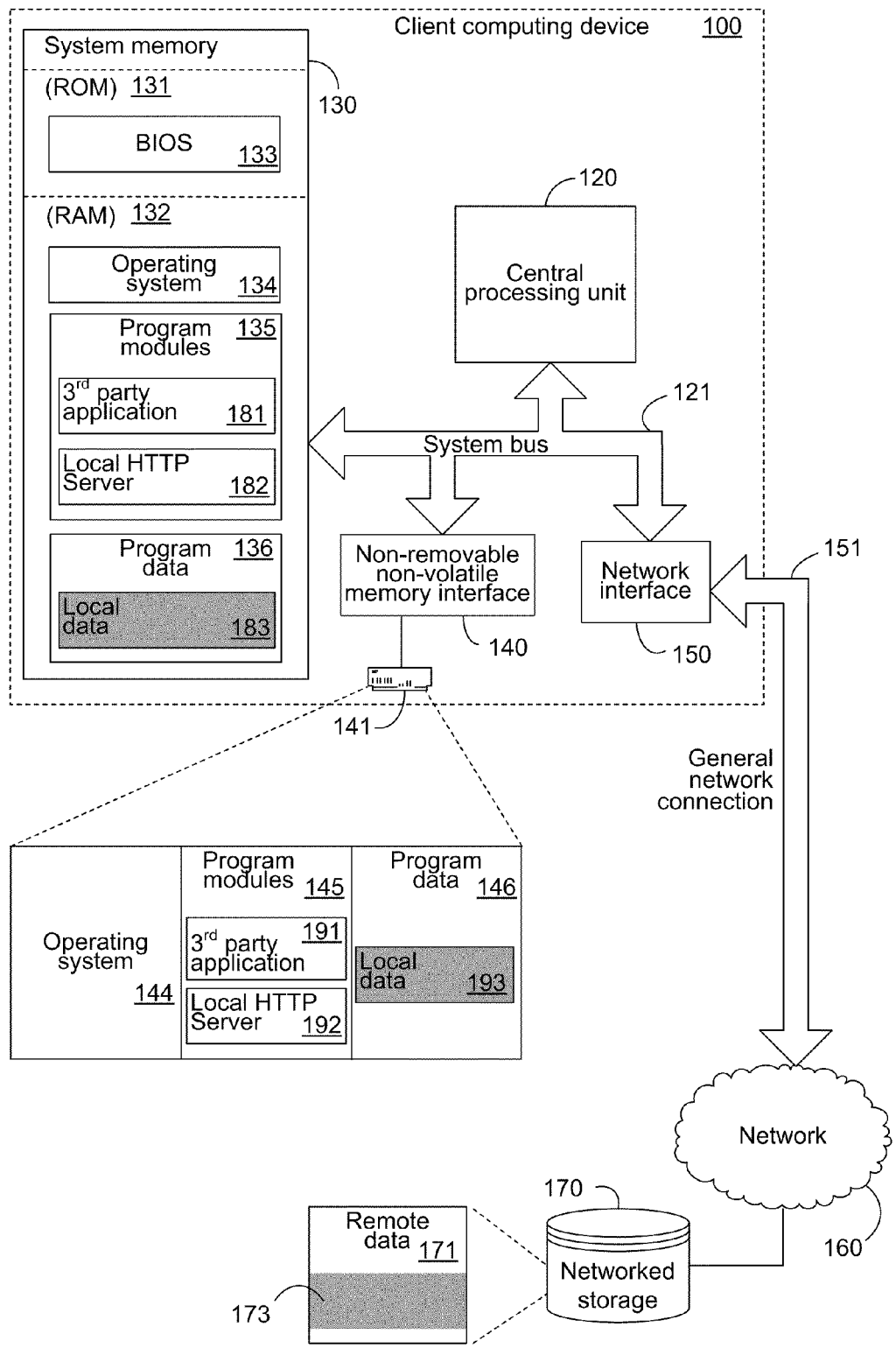
FIG. 1 is a block diagram of an exemplary computing device.

The following description relates to a unified access mechanism that provides for the transparent access of both data that is stored locally on the computing device executing the unified access mechanism and data that is stored remotely from the computing device. The unified access mechanism can identify whether the data is available locally based on the namespace of the requested data. Locally stored data can be synchronized with remotely stored data by a synching mechanism that can be integrated with the unified access mechanism. If the computing device executing unified access mechanism loses connectivity to a network, edits made to locally stored data can be subsequently transparently synchronized to remotely stored data when network connectivity is reestablished.

While the below descriptions are directed to the implementation of the unified access mechanism within the context of specific ubiquitous protocols, such as the HyperText Transfer Protocol (HTTP) and ubiquitous networks, such as the Internet, they are not so limited. In particular, the mechanisms described are both protocol and network agnostic and can operate in a manner identical to that described below on any protocol or network. As such, references to HTTP, the Internet or web sites are meant to be exemplary only and do not indicate any specific limitation of the mechanisms described.

Although not required, the descriptions below will be in the general context of computer-executable instructions, such as program modules, being executed by one or more computing devices. More specifically, the descriptions will reference acts and symbolic representations of operations that are performed by one or more computing devices or peripherals, unless indicated otherwise. As such, it will be understood that such acts and operations, which are at times referred to as being computer-executed, include the manipulation by a processing unit of electrical signals representing data in a structured form. This manipulation transforms the data or maintains it at locations in memory, which reconfigures or otherwise alters the operation of the computing device or peripherals in a manner well understood by those skilled in the art. The data structures, where data is maintained, are physical locations that have particular properties defined by the format of the data.

Generally, program modules include routines, programs, objects, components, data structures, and the like that perform particular tasks or implement particular abstract data types. Moreover, those skilled in the art will appreciate that the computing devices need not be limited to conventional personal computers, and include other computing configurations, including hand-held devices, multi-processor systems, microprocessor based or programmable consumer electronics, network PCs, minicomputers, mainframe computers, and the like. Similarly, the computing devices need not be limited to a stand-alone computing device, as the mechanisms may also be practiced in distributed computing environments where tasks are performed by remote processing devices that are linked through a communications network. In a distributed computing environment, program modules may be located in both local and remote memory storage devices.

Turning to FIG. 1, an exemplary computing device 100 is shown. The exemplary computing device 100 can include, but is not limited to, one or more central processing units (CPUs) 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures.

The computing device 100 also typically includes computer readable media, which can include any available media that can be accessed by computing device 100 and includes both volatile and nonvolatile media and removable and non-removable media. By way of example, and not limitation, computer readable media may comprise computer storage media and communication media. Computer storage media includes media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 100. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computing device 100, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, other program modules 135, and program data 136. The program modules 135 can comprise one or more application programs, such as the third-party application 181, which can be comprised of computer executable instructions that can be executed by the central processing unit 120 in accordance with mechanisms well known to those skilled in the art. The program modules 135 can also comprise a local HTTP server 182 which can provide unified access to data including both the local data 183 and the remote data 171, which will be described in further detail below. Although shown as part of the program modules 135, the local HTTP server 182 can likewise be a part of the operating system 134, or can be an amalgamation of components of the operating system 134 and other program modules 135. The program data 136 can comprise local data 183, which, in one embodiment, can be data that can be meaningful to other client computing devices and, as such, can be stored remotely so that it can be accessed by those other client computing devices. For example, the local data 183 can comprise contact information that a user may wish to access from multiple computing devices, and not just client computing device 100. As another example, the local data 183 can comprise bookmarks or other application settings that a user may wish to utilize, or be provided access to, on other computing devices in addition to the client computing device 100.

The computing device 100 may also include other removable/non-removable, volatile/nonvolatile computer storage media. By way of example only, FIG. 1 illustrates a hard disk drive 141 that reads from or writes to non-removable, nonvolatile magnetic media. Other removable/non-removable, volatile/nonvolatile computer storage media that can be used with the exemplary computing device include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140.

The drives and their associated computer storage media discussed above and illustrated in FIG. 1, provide storage of computer readable instructions, data structures, program modules and other data for the computing device 100. In FIG. 1, for example, hard disk drive 141 is illustrated as storing operating system 144, other program modules 145, and program data 146. Note that these components can either be the same as or different from operating system 134, other program modules 135 and program data 136. Operating system 144, other program modules 145 and program data 146 are given different numbers hereto illustrate that, at a minimum, they are different copies. As such, the third-party application 191 and local HTTP server 192 of the program modules 145, and the local data 193 of the program data 146 are likewise given different numbers to illustrate that, at a minimum, they are different copies of the third-party application 181, local HTTP server 182 and local data 183, respectively.

Additionally, the computing device 100 may operate in a networked environment using logical connections to one or more remote computers. For simplicity of illustration, the computing device 100 is shown in FIG. 1 to be connected to a network 160 that is not limited to any particular network or networking protocols. The logical connection depicted in FIG. 1 is a general network connection 151 that can be a local area network (LAN), a wide area network (WAN) or other network. The computing device 100 is connected to the general network connection 151 through a network interface or adapter 150 which is, in turn, connected to the system bus 121. In a networked environment, program modules depicted relative to the computing device 100, or portions or peripherals thereof, may be stored in the memory of one or more other computing devices that are communicatively coupled to the computing device 100 through the general network connection 151. It will be appreciated that the network connections shown are exemplary and other means of establishing a communications link between computing devices may be used.

The network 160 can have communicationally coupled to it a networked storage 170. The networked storage 170 can represent storage media communicationally coupled to one or more server computing devices that are, in turn, communicationally coupled to network 160. Thus, in an analogous manner to that in which the hard disk drive 141 is communicationally coupled to the client computing device 100 through the memory interface 140, the storage media that represent the networked storage 170 can likewise be communicationally coupled to one or more server computing devices that can comprise analogous components to those illustrated as part of the client computing device 100, and described in detail above. Similarly, in an analogous manner to that in which the client computing device 100 is communicationally coupled to the network 160 via the network interface 150, these one or more server computing devices can likewise be communicationally coupled to the network 160. However, for simplicity of illustration, and ease of reference, the networked storage 170 will be illustrated and referenced independently of its association with one or more server computing devices, since the operation of those server computing devices would be well known to those skilled in the art and irrelevant to the mechanisms described below.

The networked storage 170 can comprise remote data 171, that can include information accessible by, and useful to, processes executing on the client computing device 100. In addition, the remote data 171 can comprise a portion 173 thereof that can be a copy of the local data 183 and 193 as maintained locally by the client computing device 100. For example, the network storage 170 can be part of one or more websites that are directed to enabling a user to access certain information from multiple computing devices, such as the client computing device 100. Thus, in such an example, the remote data 171 may comprise, for example, photographs taken either by a user of the client computing device 100, or by other individuals that have granted such a user access to their photographs. The portion 173 of the remote data 171 can, in such an example, be the photographs that the user of the client computing device 100 has uploaded and, as such, those same photographs can be retained as the local data 183 and 193 on client computing device 100, while the remainder of the remote data 171 can be the photographs that other individuals have uploaded that have either not yet, or that never will be, downloaded to the client computing device 100 as the local data 183 and 193. As another example, the remote data 171 can comprise different types of data, some of which, such as the portion 173, may be synchronized to the client computing device 100, as the local data 183 and 193, and other of which may not be. Thus, in such an example, the remote data 171 can comprise contact information, which can be part of the portion 173 and can be synchronized to the client computing device 100 as the local data 183 and 193, and the remote data 171 can also comprise information obtained remotely, such as from data feeds or other sources, which may not necessarily be synchronized with the client computing device 100, and may only be available via access, through the network 160, to the networked storage 170.

Figure 2:
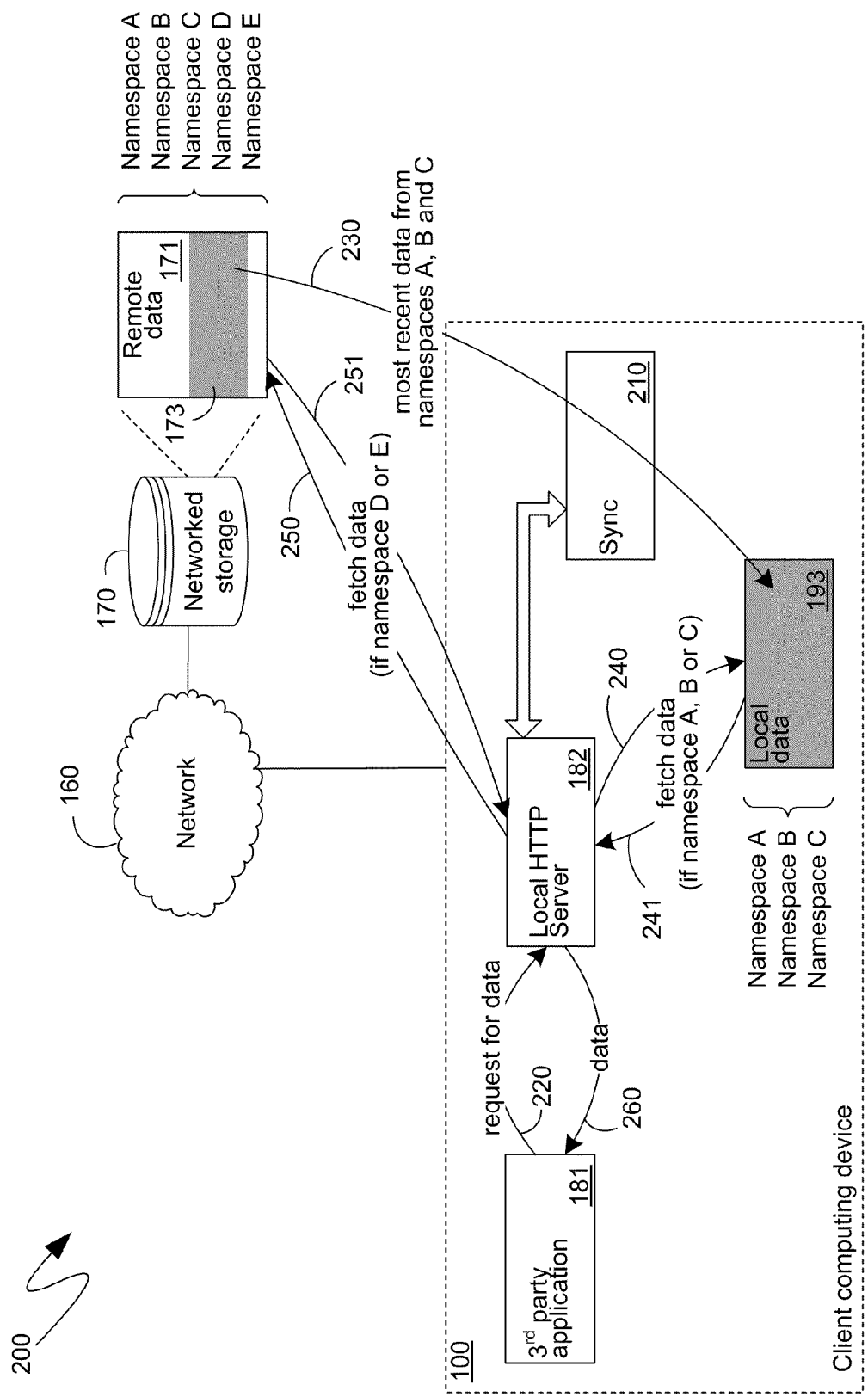
FIG. 2 is a block diagram of one exemplary online operation of an exemplary unified access mechanism.

Turning to FIG. 2, the system 200 shown therein illustrates an exemplary mechanism by which the local HTTP server 182, as executing on the client computing device 100, can act as a unified access mechanism, enabling an application program, such as the third-party application 181, to transparently access either local data 193, or remote data 171, via a single request for data 220. Initially, as shown, the third-party application 181 can direct a request for data 220 to the local HTTP server 182. Within the context of the HyperText Transfer Protocol, such a request can take the form of a GET request. However, irrespective of the particular protocol utilized, the request for data 220 can comprise an indication of which data was requested. Based on such an indication, the local HTTP server 182 can determine whether the data is available as part of the local data 193, which, as described previously, can be stored on the storage medium local to the client computing device 100, or whether the data is only available as part of the remote data 171 that can be stored on the networked storage 170.

In one embodiment, the determination of where the requested data can be located can be based on the namespace of the requested data. For example, as shown in the system 200 of FIG. 2, the data of certain namespaces, nominated namespaces A, B and C in FIG. 2, can be available from the local data 193, while the data of a different set of namespaces, including the aforementioned namespaces A, B and C, but also including other namespaces, nominated namespaces D and E, can be available from the remote data 171. Information regarding which namespaces are represented by the data that is part of the local data 193, and which namespaces are represented by data that is only available as part of the remote data 171, can be retained by the local HTTP server 182 and referenced when the request for data 220 is received.

The information regarding which namespaces of data are stored in which locations that is maintained by the local HTTP server 182 can, in one embodiment, be informed by a synchronization component 210. For example, the local HTTP server 182 can direct the synchronization component 210 to synchronize data of namespaces A, B and C between the local data 193, and the portion 173 of the remote data 171 corresponding to those namespaces. Based upon indications, by the synchronization component 210, that such a synchronization, such as that indicated by the communication 230, has been performed successfully, and has been maintained successfully, the local HTTP server 182 can maintain information indicating that data of namespaces A, B and C is available as part of the local data 193. Conversely, if the synchronization component 210 provides indication, to the local HTTP server 182, that the most recent synchronization of the local data 193 to the portion 173 of the remote data 171 has not been successfully performed, the local HTTP server 182 can maintain information indicating that the data of namespaces A, B and C is only available from the remote data 171, as the local data 193 may not reflect the most recent versions of that data.

Alternatively, the synchronization component 210 can select which data to synchronize between the local data 193 and the portion 173 of the remote data 171, and can merely inform the local HTTP server 182 of the namespaces of the selected data. For example, the synchronization component 210 may present an independent user interface that can enable a user of the computing device 100 to individually select one or more types, or namespaces, of data to be synchronized between the local data 193 and the portion 173 of the remote data 171. However, the information maintained by the local HTTP server 182, as to which namespaces of data are available locally and which are only available remotely, can still be maintained as described above.

In one embodiment, the synchronization component 210 can be an existing synchronization component, such as those commonly available today. Typically, such a synchronization component 210 can monitor the connection of the client computing device 100 to the network 160 and can, when such a connection is maintained, either continuously, or periodically, compare the portion 173 of the remote data 171 to the local data 193. Should a discrepancy be detected, the synchronization component 210 can, utilizing known synchronization techniques and technologies, copy the most recent data either from the local data 193 to the portion 173 of the remote data 171, or vice versa, as needed.

Turning back to the operation of the local HTTP server 182, once it receives the request for data 220 from an application program, such as the third-party application 181, the local HTTP server 182 can determine whether the requested data is part of a namespace of data that is available from the local data 193, or whether the requested data is part of the namespace of data that is only available from the remote data 171. If the data requested by the request 220 is part of a namespace of the data that is available from the local data 193, the local HTTP server 182 can fetch the requested data from the local data 193 as illustrated by the communications 240 and 241 of the system 200 of FIG. 2. Conversely, if the data requested by the request 220 is part of a namespace of data that is available only from the remote data 171, then the local HTTP server 182 can obtain the requested data from the remote data 171, as illustrated by the communications 250 and 251. As will be recognized by those skilled in the art, the communications 250 and 251 can comprise a network communication such as would be directed through the network interface 150 of the client computing device 100, shown in FIG. 1, the network 160 itself, and the one or more server computing devices that host the networked storage 170.

Once the local HTTP server 182 has obtained the requested data, either from the remote data 171 or the local data 193, it can return that data to the requesting application, as illustrated by the communication 260. In such a manner, the local HTTP server 182 can provide a singular source of data, irrespective of whether that data is stored locally to the client computing device 100, or remotely therefrom. Thus, an application program, such as the third-party application 181, need only direct requests for data, such as the request for data 220, to the local HTTP server 182, irrespective of whether the requested data is available locally, or remotely. In one embodiment, the local HTTP server 182 can present an Internet Protocol (IP) address to other processes executing on the client computing device 100, so that application programs originally designed to request data from the networked storage 170, such as from one or more websites that can provide a user interface through which to conveniently access the data stored on the networked storage 170, can be easily modified to utilize the local HTTP server 182 instead. For such applications, the utilization of the local HTTP server 182 can provide speed benefits if the requested data is, in fact, available locally, while adding only minimal overhead if the data is only available remotely.

Figure 3:
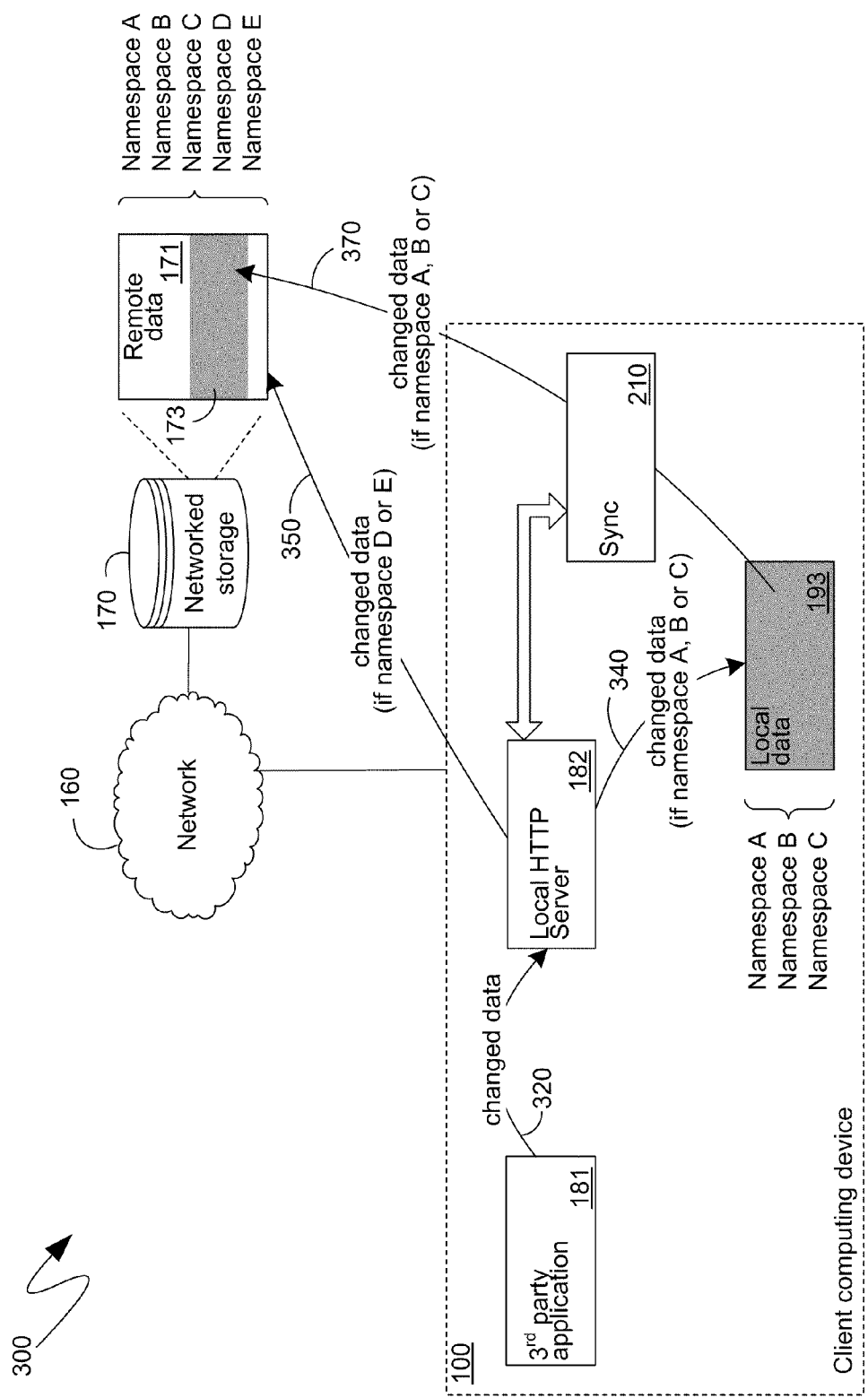
FIG. 3 is a block diagram of another exemplary online operation of the exemplary unified access mechanism.

Turning to FIG. 3, the system 300 shown therein illustrates an exemplary series of mechanisms supporting the editing, or modification, of data. Initially, an application, such as the third-party application 181, can attempt to change some data via the communication 320, which can provide the changed data to the local HTTP server 182. Within the specific context of the HyperText Transfer Protocol, the change data communication 320 can provide the changed data via an HTTP POST command, or other like command. However, irrespective of the particular protocol utilized, the change data communication 320 can comprise an indication of which data was changed and the new data that it should be changed to. Utilizing such information, the local HTTP server 182 can identify, based on the namespace of the data that was changed, whether such data exists in the local data 193, or whether it only exists in the remote data 171, in the manner described in detail above. If the data that the third-party application 181 is attempting to change exists only as part of the remote data 171, the local HTTP server 182 can provide that changed data to the remote data 171, such as via communication 350. As will be known by those skilled in the art, the communication 350 can comprise network communications such as would be directed through the network interface 150 of the client computing device 100, shown in FIG. 1, the network 160 itself, and the one or more server computing devices that host the networked storage 170.

However, if the data changed by the communication 320 is part of the local data 193, local HTTP server 182 can change that local copy of the data, as illustrated by the communication 340. Subsequently, an independent synchronization process, such as the synchronization mechanism 210, can, utilizing known synchronization techniques and technologies, detect the change of data that was performed by the local HTTP server 182, as part of the communication 340. Having detected the change, the synchronization mechanism 210 can synchronize the local data 193 with the portion 173 of the remote data 171 to which it corresponds by copying the changed data from the local data 193 to the portion 173 of the remote data 171, as illustrated by the communication 370. In such a manner, the change requested by the third-party application 181, via the communication 320, can be reflected in both the local data 193, and the remote data 171, if the data being changed was, in fact, part of the local data 193.

Figure 4:
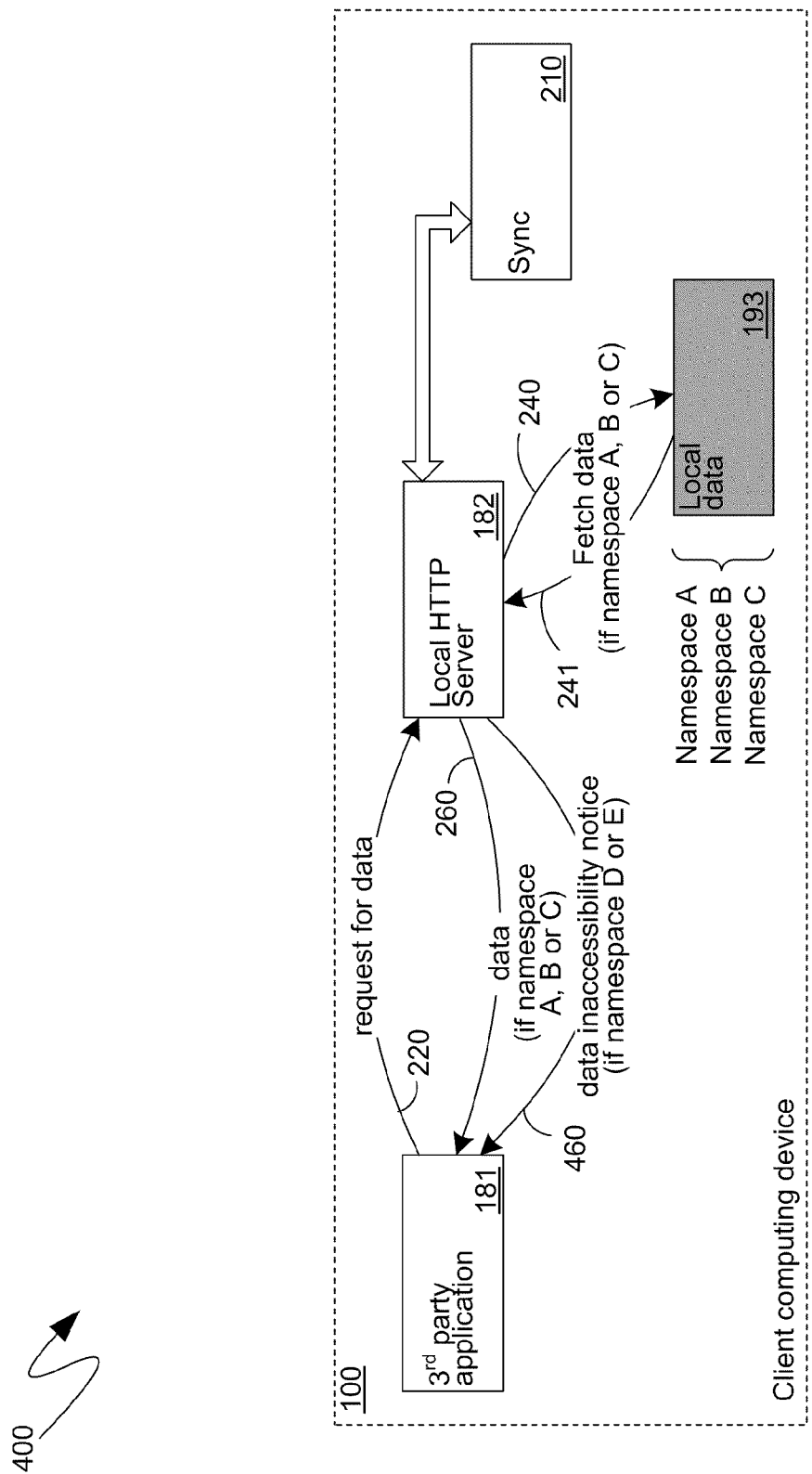
FIG. 4 is a block diagram of one exemplary offline operation of an exemplary unified access mechanism.

Turning to FIG. 4, the system 400 shown therein illustrates an exemplary series of mechanisms that are analogous to those illustrated by the system 200 of FIG. 2, except that, as shown in FIG. 4, the client computing device 100 of the system 400 no longer maintains a communicational connection to the network 160, which is, therefore, not shown in FIG. 4. An application, such as the third-party application 181, can still send a request for data, such as a request for data 220, described above, to the local HTTP server 182. As also described above, the local HTTP server 182 can determine if the data is available locally, and, if it is, the local HTTP server 182 can obtain such data from the local data 193 via the communications 240 and 241, and then provide that requested, and now obtained, data back to the requesting application via the communication 260, all of which was described previously.

However, in the context of the system 400 of FIG. 4, where the client computing device 100 no longer maintains a communicational connection to the network 160, if the local HTTP server 182 determines that the data requested by the request 220 is part of a namespace of data that is only available from the remote data 171, shown previously, the local HTTP server 182 can attempt to access such data and, when such an attempt fails because of the lack of the communicational connection to the network 160, the local HTTP server 182 can return a data inaccessibility notice 460 to the requesting third-party application 181. In one embodiment, the data inaccessibility notice 460 can be equivalent to the type of notice that would have been provided to the requesting third-party application 181, were they requesting third-party application 181 to have directly attempted to access the remote data 171, or any other information available only via communicational connection to the network 160.

Figure 5:
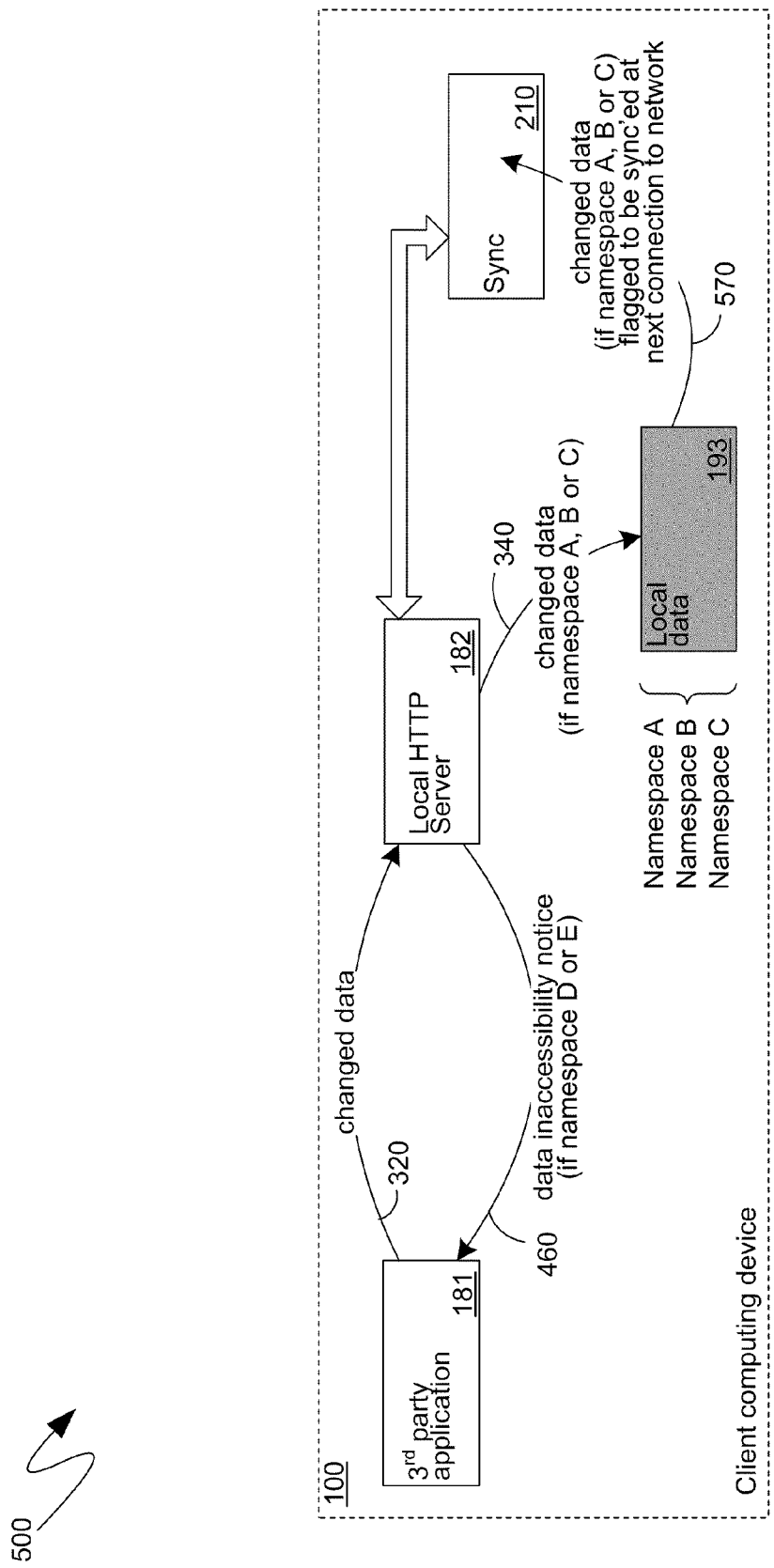
FIG. 5 is a block diagram of another exemplary offline operation of the exemplary unified access mechanism.

The system 500 of FIG. 5 illustrates an analogous situation to that shown in FIG. 4, where the client computing device 100 no longer maintains a communicational connection to the network 160, which is, therefore, not shown in FIG. 5. In the system 500 of FIG. 5, an application, such as the third-party application 181, can attempt to change data, such as via the communication 320, in the manner described previously. As described above, if the local HTTP server 182 determines that the data to be changed is only available as part of the remote data 171, shown previously, the local HTTP server 182 can attempt to change such data and, when such an attempt fails because of the lack of the communicational connection to the network 160, the local HTTP server 182 can return the data inaccessibility notice 460, in the manner described previously.

However, if the local HTTP server 182 determines that the data to be changed is part of a namespace of data that is in the local data 193, it can proceed to change that data, via communication 340, in the manner described previously. The synchronization mechanism 210 can then, as before, detect such a change. In the manner well known to those of skill in the synchronization arts, the synchronization mechanism 210 can retain information regarding that change of data, as illustrated by the communication 570, and can, at a subsequent reestablishing of the communicational connection between the client computing device 100 and the network 160 (not shown in FIG. 5), proceed to copy the changed data to the portion 173 of the remote data 171 (both also not shown in FIG. 5) with which the local data 193 is synchronized. In such a manner, data access, and data modifications, can be performed by applications, such as the third-party application 181, via the local HTTP server 182 even when the client computing device 100 is communicationally decoupled from the network 160, at least for data that is part of the name spaces of data retained locally as the local data 193. Any changes to the local data 193 that can be made while the client computing device 100 is communicationally decoupled from the network 160 can then be reflected back to the remote data 171 by the synchronization mechanism 210 when the communicational connection with the network 160 is reestablished.

Figure 6:
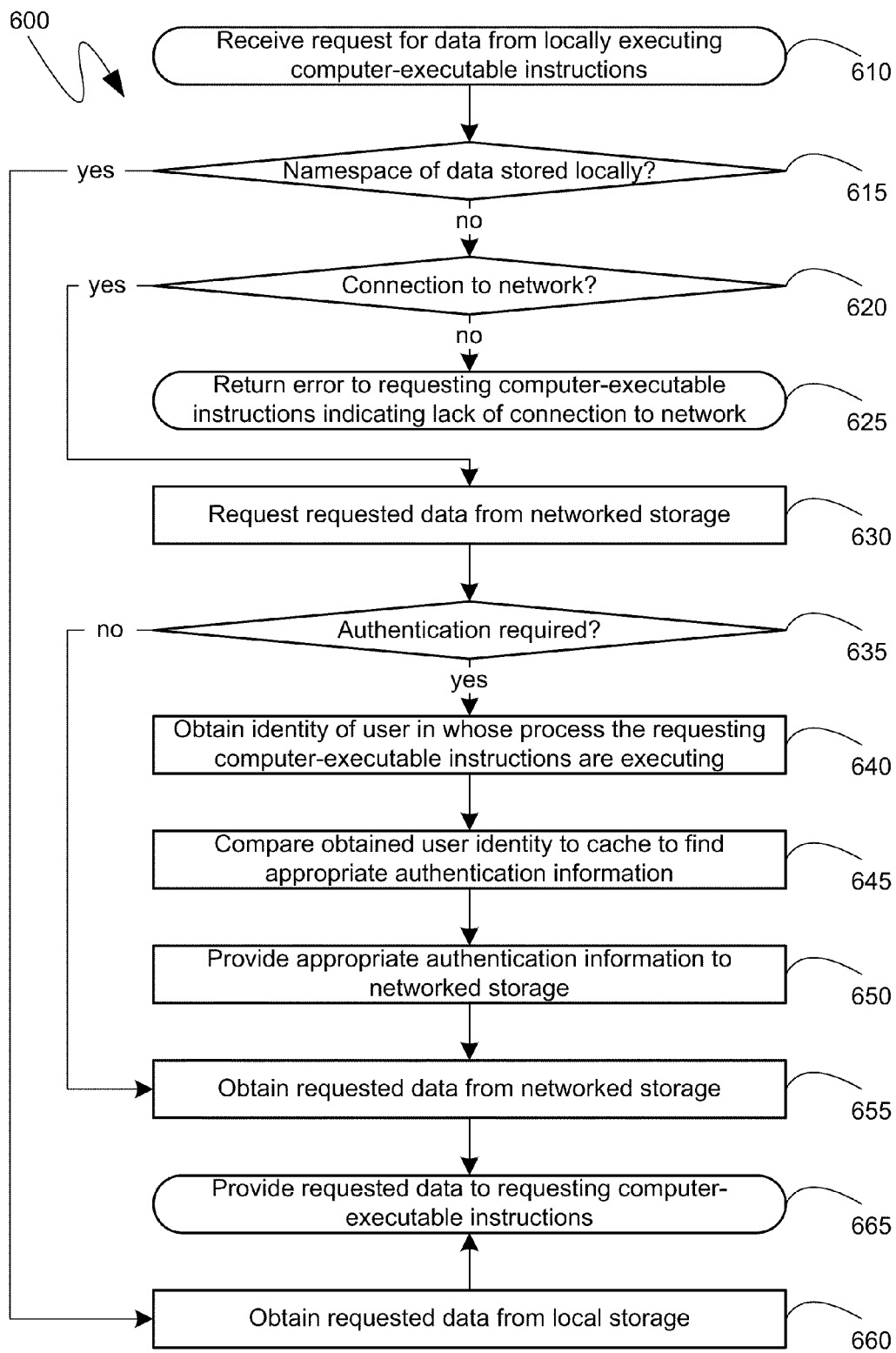
FIG. 6 is a flow diagram of an exemplary operation of an exemplary unified access mechanism.

Turning to FIG. 6, the flow diagram 600 shown therein illustrates an exemplary series of steps that can be performed by a component, such as the local HTTP server 182, shown and described in detail above, that can provide transparent access to either local or remote data. Initially, as shown in FIG. 6, a request for data can be received, at step 610, from locally executing computer executable instructions, such as the third-party application 181, also shown and described in detail above. Subsequently, at step 615, a determination can be made as to whether data that is part of the namespace of the data that was requested is stored locally. If, at step 615, it is determined that the requested data belongs to a namespace whose data is stored locally, processing can proceed to step 660 where the requested data can be obtained from the local storage. In one embodiment, described above, a determination, that is not specifically illustrated by the flow diagram 600 of FIG. 6, can be made prior to the obtaining of the data from the local storage, at step 660. More specifically, such a determination can verify that the local copy of the data relevant data has been successfully synchronized by a synchronization mechanism. If such a synchronization mechanism has not been successfully performed, processing can return to step 620. In one embodiment, in such a case, if, at step 620, it is determined that a communicational connection to the network is not currently available, processing can return to step 660 and obtain the requested data from local storage, since such data can be the best copy of the data currently available. In another embodiment, however, data can have an expiration associated with it such that, if the local copy of the data has not been recently synchronized, and a communicational connection with the network is unavailable, the data can be considered to have expired, or otherwise become stale, if the communicational connection with the network has been unavailable for greater than a predetermined length of time. In such a case, the error, described in more detail below, at step 625 can be presented even if a copy of the data does exist in the local storage, since such a copy can be considered to be stale or expired. Once, however, the data is obtained from the local storage, at step 660, subsequently, at step 665, relevant processing can end when the requested data, which was obtained at step 660, is provided to the requesting computer-executable instructions.

If, however, at step 615, it is determined that the requested data is part of the namespace whose data is not stored locally, a subsequent determination, at step 620, can determine whether the computing device on which the steps are being performed currently maintains a communicational connection with the network through which the remotely stored requested data can be accessed. If, at step 620, it is determined that no such communicational connection is currently maintained, the relevant processing can end at step 625 with the returning, to the requesting computer-executable instructions, of an error indicating that there is no communicational connection to the requested data. Alternatively, if, at step 620, it is determined that a communicational connection to the relevant network is maintained, processing can proceed to step 630. At step 630, the data that was requested at step 610 can be requested from networked storage.

The data stored in networked storage may be protected by one or more authentication mechanisms. For example, websites that can store data on the networked storage can require the provision of various authentication information before providing access to the data. Typically, such authentication information can comprise an identification of a specific user, such as a username, and a shared secret, such as a password known to both the user and to the authenticating website. For example, a website that can provide a user with network access to that user's photographs, and photographs of other users associated with that user, can request that the user provide a username and password prior to displaying, or otherwise providing access to, those photographs.

In one embodiment, the component that provides a transparent access to data, irrespective of whether such data is stored locally or remotely, can further provide for automated authentication mechanisms to facilitate the obtaining of remotely stored data. For example, typically, in order for such a component to even receive the request for data from the locally executing computer-executable instructions, such as that received in step 610, the locally executing computer-executable instructions would need to be executing as part of a user process that would grant them access to the component that provides the transparent access to data. Thus, a user on whose behalf those computer-executable instructions were executing would, typically, already have logged onto the client computing device, such as by providing identification and authentication information. While the authentication mechanisms implemented by a client computing device to enable the user to logon may be different from those implemented by the various websites that may protect access to the remotely stored data, the mere fact that the user was authenticated on the client computing device prior to being able to access the component that provides the transparent access to data can enable such a component to associate the credentials of such a user with the relevant identification and authentication information that may be required by the various websites, or other protection mechanisms, that can protect the remotely stored data.

Thus, if, at step 635, it is determined that authentication is required, processing can proceed to step 640 at which point the identity of the user in whose process space the requesting computer-executable instructions are executing can be obtained. Utilizing such an identity, authentication information required at step 635 can be determined. For example, an association can be maintained between the identity of a user on the client computing device and that user's authentication credentials at the one or more various websites through which the remote data can be accessed. In one embodiment, such information can be cached such that the user may be required to provide the authentication information relevant to the particular requested data at least once, but then, during subsequent accesses, such information can be cached with the component that provides the transparent access to data and can simply be referenced based on the identity of the user on the client computing device from whose process space the request, at step 610, is received. Thus, as shown, at step 645, such a cache can be referenced with the identity of the user, determined at step 640, and appropriate authentication information can be obtained therefrom. The authentication information obtained at step 645 can then be provided to the requesting network entity at step 650. Subsequent to a successful authentication, the requested data can be obtained from the networked storage at step 655. The relevant processing can then end at step 665 with the provision of such data to the requesting computer-executable instructions.

If, however, at step 635, it is determined that no authentication is required, processing can simply proceed to obtain the requested data from the networked storage at step 655 and then provide such requested data to the requesting computer-executable instructions at step 665.

Figure 7:
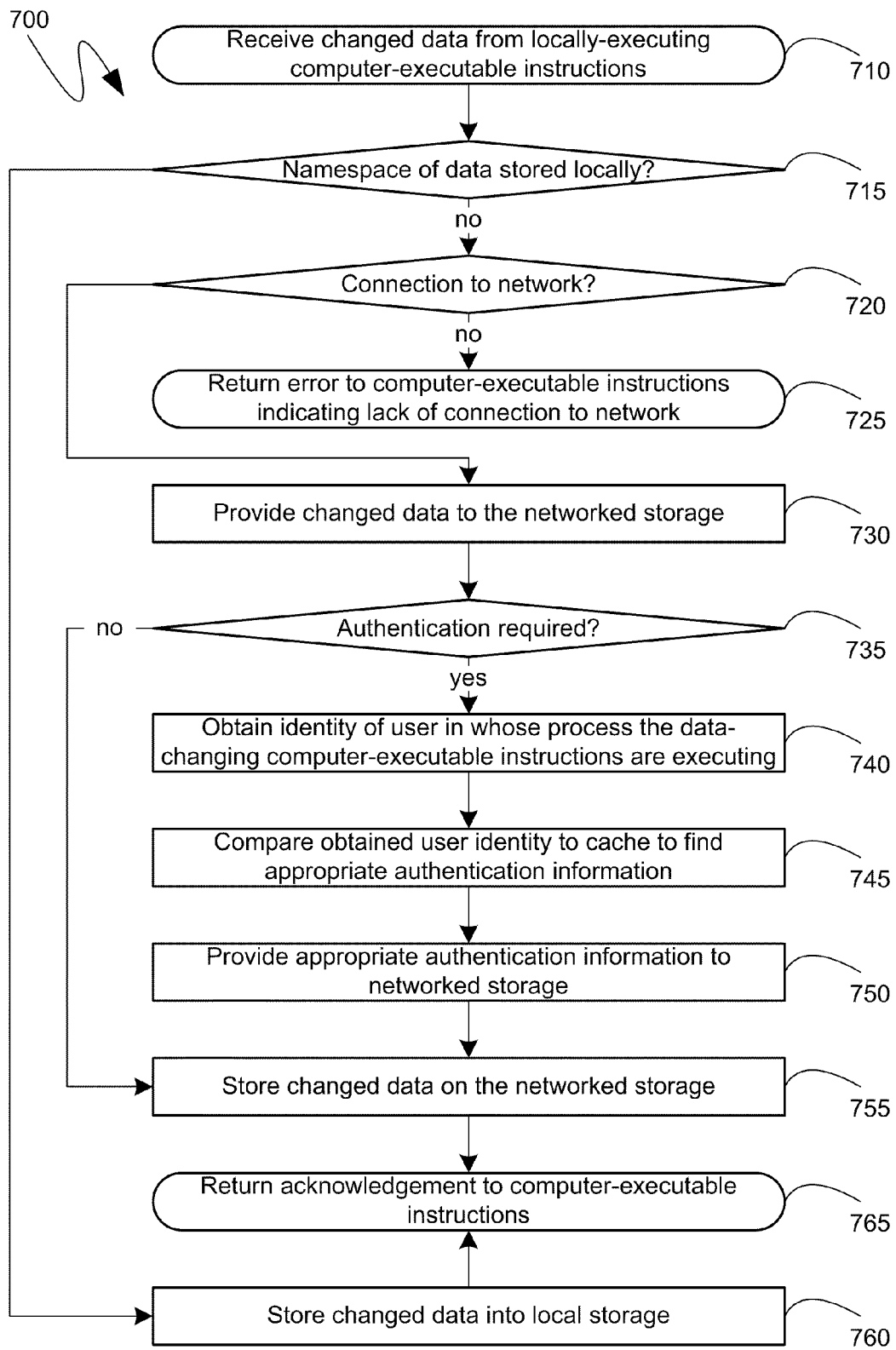
FIG. 7 is a flow diagram of another exemplary operation of the exemplary unified access mechanism.

Turning to FIG. 7, the flow diagram 700 shown therein illustrates an exemplary series of steps, analogous to those described above with reference to the flow diagram 600 of FIG. 6, except that, as shown in the flow diagram 700 of FIG. 7, processing can be initiated, at step 710, with the receipt of changed data from locally executing computer-executable instructions that is to be stored, or otherwise receiving a request to edit, or otherwise modify, specified data. As before, a determination can be made, such as at step 715, as to whether the namespace of the data to be changed is a namespace whose data is stored locally. If the data to be changed is stored locally, processing can proceed to step 760 at which point the changed data can be stored in the local storage. Subsequently, the relevant processing can end at step 765 with the returning of an acknowledgment, or other indicator of success, to the computer-executable instructions that provided such data at step 710.

Alternatively, if, at step 715, it is determined that the data is stored remotely, a check can be made, at step 720, as to whether the computing device upon which the computer-executable instructions are executing maintains a communicational connection to the network through which such remotely stored data can be accessed. If no such communicational connection is maintained, relevant processing can end at step 725 with the indication of an error to the computer executable instructions for whom the request to change the data was received at step 710.

If the computing device on which the computer executable instructions are executing does maintain a communicational connection to the network through which the remotely stored data can be accessed, processing can proceed to step 730 at which point the changed data can be provided to the networked storage. If authentication is required to access, or otherwise change, the relevant data on the networked storage, as determined at step 735, processing can proceed with step 740, 745 and 750 which are equivalent to the steps 640, 645 and 650, described in detail above with reference to the flow diagram 600 of FIG. 6. If authentication is required, and it is successfully provided, or if no authentication is required, processing can proceed with step 755 at which point the changed data can be stored on the networked storage. The relevant processing can then end, at step 765, with the return of an acknowledgment, or other indicator of success, to the computer-executable instructions from whom the changed data was originally received at step 710.

Returning back to FIG. 2, given the above descriptions, it can be seen that an advantage of the above-described mechanisms is that the local HTTP server 182, in the present examples, can provide a single interface through which application programs, such as the third-party application program 181, can access data irrespective of the storage location of such data. Thus, for example, if, in a future manifestation of the synchronization mechanism 210 data belonging to the namespace D is also synchronized between the remote data 171 and the local data 193, no modification need be made to application programs, such as the third-party application 181 to take advantage of such locally available data. Instead, transparently to such application programs, further requests for data of the namespace D would now be satisfied by the local HTTP server 182 from the local data 193 and would, if appropriate, be synchronized back to the remote data 171 by the synchronization mechanism 210. Analogously, should data of, for example, the namespace A, no longer by synchronized by the synchronization mechanism 210, application programs, such as the third-party application program 181 would still continue to operate properly without modification since requests for such data would simply be transparently fulfilled by the local HTTP server 182 from the remote data 171.

As can be seen from the above descriptions, mechanisms for providing transparent access to both local and remote data, irrespective of the actual location of the data, have been provided. In view of the many possible variations of the subject matter described herein, we claim as our invention all such embodiments as may come within the scope of the following claims and equivalents thereto.

We claim:

1. One or more computer-readable media comprising computer-executable instructions for providing transparent access to both locally stored data and remotely stored data, the computer-executable instructions directed to steps comprising:

synchronizing data of at least one namespace between the locally stored data and the remotely stored data such that changes to data of the at least one namespace of data performed on the locally stored data are copied to the remotely stored data and such that changes to data of the at least one namespace of data performed on the remotely stored data are copied to the locally stored data;
providing a single interface for the access of a set of data irrespective of whether the set of data is part of the locally stored data or the remotely stored data
receiving a data access request on the provided interface that is directed to the set of data;
determining whether the set of data is part of the locally stored data or the remotely stored data based on a namespace of the set of data;
providing access to the set of data from the locally stored data if the determining indicated that the set of data is part of the locally stored data; and
providing access to the set of data from the remotely stored data if the determining indicated that the set of data is part of the remotely stored data and if a computing device executing the computer-executable instructions comprises a communicational connection to the remotely stored data.

2. The computer-readable media of claim 1, wherein the computer-executable instructions directed to the providing the access to the set of data from the locally stored data comprise computer-executable instructions directed to checking a status of the synchronization of data and only providing the access to the set of data from the locally stored data if the synchronization of data is current.

3. The computer-readable media of claim 1, wherein the computer-executable instructions directed to the providing the access to the set of data from the locally stored data comprise computer-executable instructions directed to checking a status of the communicational connection to the remotely stored data and only providing the access to the set of data from the locally stored data if the locally stored data is not stale.

4. The computer-readable media of claim 1, wherein the computer-executable instructions directed to the providing the access to the set of data from the remotely stored data comprise computer-executable instructions for authenticating to an authentication mechanism by which access to the remotely stored data is protected.

5. The computer-readable media of claim 4, wherein the computer-executable instructions directed to the authenticating comprise computer-executable instructions for obtaining identification and authentication information to provide to the authentication mechanism based on an identification of a user from whose process space the data access request is received.

6. The computer-readable media of claim 5, wherein the identification and authentication information are obtained from a cache associated with the user and populated by prior entries, by the user, of the identification and authentication information so as to access the remotely stored data.

7. The computer-readable media of claim 1, wherein the received data access request comprises a request to modify the set of data and wherein the computer-executable instructions directed to the providing the access to the set of data comprise computer-executable instructions for modifying the set of data in accordance with the request to modify the set of data.

8. The computer-readable media of claim 7, wherein, if the computing device executing the computer-executable instructions does not comprise the communicational connection to the remotely stored data, the computer-executable instructions directed to the synchronizing comprise computer-executable instructions directed to copying the modified set of data to the remotely stored data when the communicational connection to the remotely stored data is restored.

9. A method of providing transparent access to both locally stored data and remotely stored data, the method comprising the steps of:
synchronizing data of at least one namespace between the locally stored data and the remotely stored data such that changes to data of the at least one namespace of data performed on the locally stored data are copied to the remotely stored data and such that changes to data of the at least one namespace of data performed on the remotely stored data are copied to the locally stored data;
providing a single interface for the access of a set of data irrespective of whether the set of data is part of the locally stored data or the remotely stored data
receiving a data access request on the provided interface that is directed to the set of data;
determining whether the set of data is part of the locally stored data or the remotely stored data based on a namespace of the set of data;
providing access to the set of data from the locally stored data if the determining indicated that the set of data is part of the locally stored data; and
providing access to the set of data from the remotely stored data if the determining indicated that the set of data is part of the remotely stored data and if a computing device performing the method comprises a communicational connection to the remotely stored data.

10. The method of claim 9, wherein the providing the access to the set of data from the locally stored data comprises checking a status of the synchronization of data and only providing the access to the set of data from the locally stored data if the synchronization of data is current.

11. The method of claim 9, wherein the providing the access to the set of data from the locally stored data comprises checking a status of the communicational connection to the remotely stored data and only providing the access to the set of data from the locally stored data if the locally stored data is not stale.

12. The method of claim 9, wherein the providing the access to the set of data from the remotely stored data comprises authenticating to an authentication mechanism by which access to the remotely stored data is protected.

13. The method of claim 12, wherein the authenticating comprises computer-executable instructions for obtaining identification and authentication information to provide to the authentication mechanism based on an identification of a user from whose process space the data access request is received.

14. The method of claim 13, wherein the identification and authentication information are obtained from a cache associated with the user and populated by prior entries, by the user, of the identification and authentication information so as to access the remotely stored data.

15. The method of claim 1, wherein the received data access request comprises a request to modify the set of data and wherein the providing the access to the set of data comprises modifying the set of data in accordance with the request to modify the set of data.

16. The method of claim 15, wherein, if the computing device performing the method does not comprise the communicational connection to the remotely stored data, the synchronizing comprises copying the modified set of data to the remotely stored data when the communicational connection to the remotely stored data is restored.

17. A computing device comprising:
locally stored data;
at least one application program;

a synchronization mechanism for synchronizing data of at least one namespace between the locally stored data and a remotely stored data such that changes to data of the at least one namespace of data performed on the locally stored data are copied to the remotely stored data and such that changes to data of the at least one namespace of data performed on the remotely stored data are copied to the locally stored data; and a unified data access mechanism providing transparent access to both the locally stored data and the remotely stored data, the unified data access mechanism performing steps comprising:

providing a single interface for the access of a set of data irrespective of whether the set of data is part of the locally stored data or the remotely stored data receiving a data access request on the provided interface that is directed to the set of data from the at least one application program;

determining whether the set of data is part of the locally stored data or the remotely stored data based on a namespace of the set of data;

providing the at least one application program access to the set of data from the locally stored data if the determining indicated that the set of data is part of the locally stored data; and providing the at least one application program access to the set of data from the remotely stored data if the determining indicated that the set of data is part of the remotely stored data and if the computing device comprises a communicational connection to the remotely stored data.

18. The computing device of claim 17, wherein the unified data access mechanism performs further steps comprising: authenticating to an authentication mechanism by which access to the remotely stored data is protected if the providing the at least one application program the access to the set of data is from the remotely stored data.

19. The computing device of claim 18, wherein the unified data access mechanism performs further steps comprising: obtaining identification and authentication information to provide to the authentication mechanism based on an identification of a user in whose process space the at least one application program is executing on the computing device.

20. The computing device of claim 17, wherein the received data access request from the at least one application program comprises a request, by the at least one application program, to modify the set of data; and wherein the providing, by the unified data access mechanism, the access to the set of data comprises modifying, by the unified data access mechanism, the set of data in accordance with the request, by the at least one application program, to modify the set of data.

\* \* \* \* \*